United States Patent
Poon et al.

(10) Patent No.: US 10,114,861 B2
(45) Date of Patent: Oct. 30, 2018

(54) EXPANDABLE AD HOC DOMAIN SPECIFIC QUERY FOR SYSTEM MANAGEMENT

(71) Applicant: DELL PRODUCTS L.P., Round Rock, TX (US)

(72) Inventors: Stanley K. Poon, Los Altos, CA (US); Ferdinand N. Silva, Santa Clara, CA (US); Yao Lu, Palo Alto, CA (US); Praharsh S. Shah, Fremont, CA (US); Raymond Milkey, Los Altos, CA (US); Prabhat D. Tripathi, Milpitas, CA (US)

(73) Assignee: DELL PRODUCTS L.P., Round Rock, TX (US)

( * ) Notice: Subject to any disclaimer, the term of this patent is extended or adjusted under 35 U.S.C. 154(b) by 794 days.

(21) Appl. No.: 14/170,494

(22) Filed: Jan. 31, 2014

(65) Prior Publication Data
US 2015/0220553 A1    Aug. 6, 2015

(51) Int. Cl.
    *G06F 17/30*    (2006.01)
(52) U.S. Cl.
    CPC .............. *G06F 17/30427* (2013.01)
(58) Field of Classification Search
    CPC ........... G06F 11/1474; G06F 17/30516; G06F 17/30424; G06F 17/30401; G06F 17/2705; G06F 17/30979; Y10S 707/99933
    USPC ....................................................... 707/722
    See application file for complete search history.

(56) References Cited

U.S. PATENT DOCUMENTS

| | | | |
|---|---|---|---|
| 5,615,400 A | 3/1997 | Cowsar et al. | |
| 6,516,312 B1 | 2/2003 | Kraft et al. | |
| 6,681,230 B1 * | 1/2004 | Blott | G06F 8/38 |
| 6,704,726 B1 * | 3/2004 | Amouroux | G06F 17/30433 |
| 7,657,612 B2 | 2/2010 | Manchester et al. | |
| 7,676,452 B2 | 3/2010 | Doganata et al. | |
| 8,327,351 B2 | 12/2012 | Paladino et al. | |
| 8,356,027 B2 | 1/2013 | Jaecksch et al. | |
| 8,375,044 B2 | 2/2013 | Zabokritski et al. | |
| 8,655,824 B1 * | 2/2014 | Allen | G06N 5/025 706/47 |
| 8,805,875 B1 * | 8/2014 | Bawcom | G06F 17/30424 707/718 |
| 9,818,087 B2 * | 11/2017 | Cooper | G06Q 10/1057 |
| 2005/0154725 A1 * | 7/2005 | Day | G06F 17/30454 |
| 2006/0080313 A1 * | 4/2006 | Freire | G06F 17/30557 |
| 2006/0112175 A1 | 5/2006 | Sellers et al. | |
| 2008/0091633 A1 * | 4/2008 | Rappaport | G06N 5/022 706/50 |
| 2009/0024678 A1 * | 1/2009 | Milby | G06F 3/0613 |

(Continued)

*Primary Examiner* — Thanh-Ha Dang
(74) *Attorney, Agent, or Firm* — Jackson Walker LLP; Christopher J. Rourk

(57) ABSTRACT

A system for performing an ad hoc query comprising a query service operating on a processor and configured to receive an ad hoc query in a domain-specific language. A query parsing service operating on the processor and configured to receive a validate request and a parse request from the query service and to return a query object to the query service. A queryable interface operating on the processor and configured to receive the query object and to transmit the query object to one or more framework services for execution. New domain key words can be introduced dynamically and matched to registered queryable services to process queries containing those key words.

20 Claims, 9 Drawing Sheets

(56) References Cited

U.S. PATENT DOCUMENTS

| | | | |
|---|---|---|---|
| 2009/0049010 A1* | 2/2009 | Bodapati | G06F 17/30864 |
| 2009/0138427 A1* | 5/2009 | Kalavade | G06Q 10/0637 |
| 2009/0313202 A1* | 12/2009 | Grabarnik | G06F 17/3053 |
| | | | 706/50 |
| 2009/0319498 A1* | 12/2009 | Zabokritski | G06F 17/30427 |
| 2009/0319501 A1* | 12/2009 | Goldstein | G06F 17/30427 |
| 2010/0082632 A1* | 4/2010 | Kumar | G06F 17/30292 |
| | | | 707/741 |
| 2010/0312602 A1* | 12/2010 | McLoughlin | G06Q 30/0205 |
| | | | 705/7.34 |
| 2010/0312782 A1* | 12/2010 | Li | G06F 17/30991 |
| | | | 707/769 |
| 2012/0102018 A1* | 4/2012 | Yang | G06F 17/3069 |
| | | | 707/709 |
| 2012/0259801 A1 | 10/2012 | Ji et al. | |
| 2012/0331010 A1* | 12/2012 | Christie | G06F 17/30283 |
| | | | 707/802 |
| 2013/0041880 A1* | 2/2013 | Walter | G06F 17/30893 |
| | | | 707/708 |
| 2013/0311166 A1* | 11/2013 | Yanpolsky | G06F 17/30654 |
| | | | 704/2 |
| 2014/0046969 A1* | 2/2014 | Ejsing | G06F 17/3051 |
| | | | 707/769 |
| 2014/0297834 A1* | 10/2014 | Tripathi | G06F 8/63 |
| | | | 709/224 |
| 2015/0074083 A1* | 3/2015 | Hutzel | G06F 17/30418 |
| | | | 707/716 |
| 2015/0131997 A1* | 5/2015 | Syed | H04Q 11/0066 |
| | | | 398/69 |
| 2015/0134632 A1* | 5/2015 | Golan | G06F 17/3053 |
| | | | 707/706 |

\* cited by examiner

EXPANDABLE AD HOC DOMAIN SPECIFIC QUERY FOR SYSTEM MANAGEMENT

TECHNICAL FIELD

The present invention relates to enterprise software development and management, and more specifically to an ad hoc domain specific query system and method for an enterprise software environment.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

A system for performing an ad hoc query is provided that includes a query service operating on a processor and configured to receive an ad hoc query in a domain-specific language. A query parsing service operating on the processor is configured to receive a validate request and a parse request from the query service and to return a query object to the query service. A queryable interface operating on the processor is configured to receive the query object and to transmit the query object to one or more framework services for execution.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which.

DETAILED DESCRIPTION OF THE INVENTION

Figure 1:
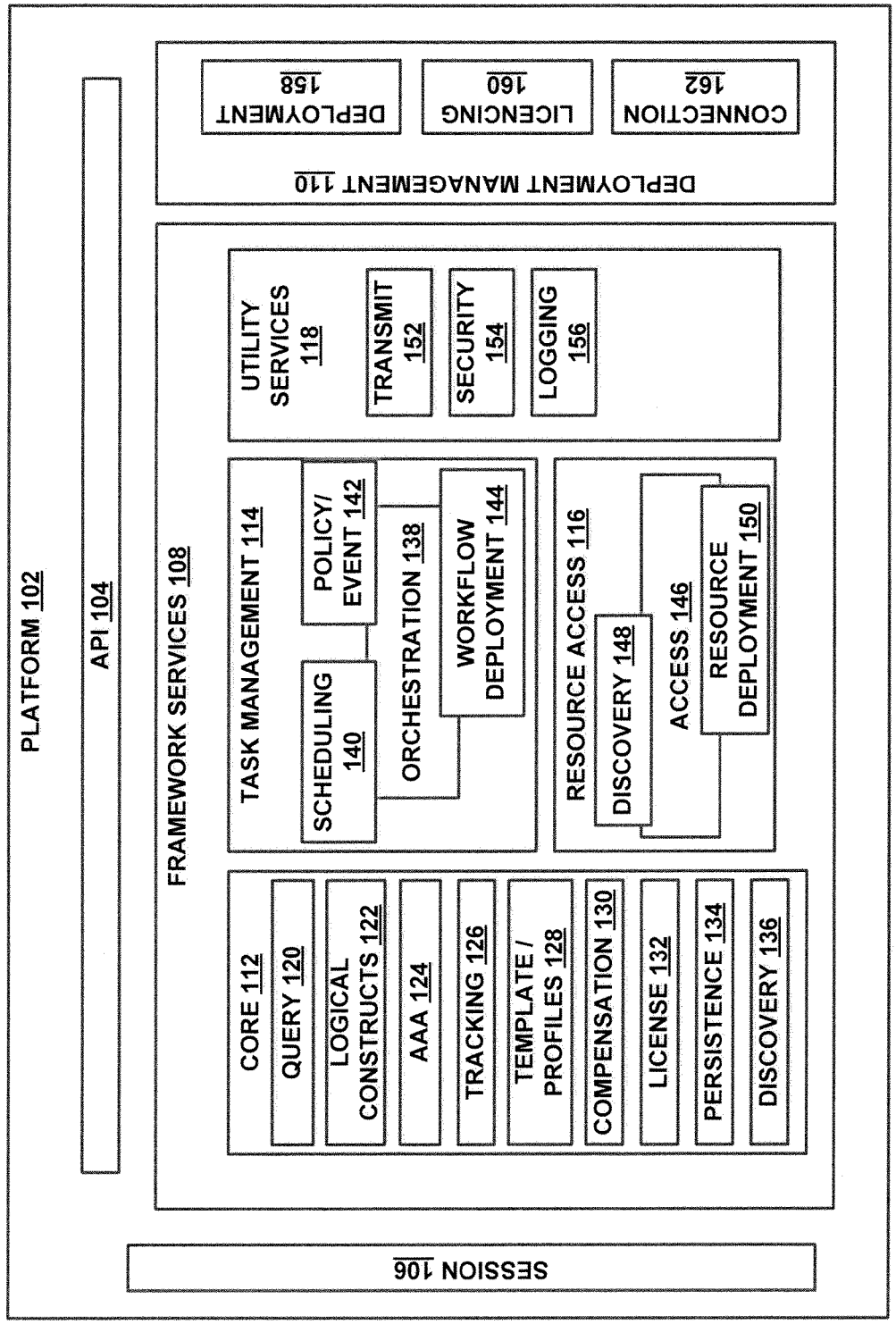
FIG. 1 is a diagram of a system for providing an agile framework for vertical application development and delivery, in accordance with an exemplary embodiment of the present disclosure.

In the description that follows, like parts are marked throughout the specification and drawings with the same reference numerals. The drawing figures might not be to scale and certain components can be shown in generalized or schematic form and identified by commercial designations in the interest of clarity and conciseness.

A framework is required that allows rapid development of Converged Infrastructure (CI) applications that are optimized for agile style. In particular, the proposed framework allows application features to be developed from the user interface to the south bound device drivers (end-to-end). The framework also allows applications to be deployed as modular units dynamically at runtime, to enable in-service deployment and upgrade. These applications can handle new devices or modify existing application logic dynamically without a rebuild/recompilation of the application, or even restart.

FIG. 1 is a diagram of a system 100 for providing an agile framework for vertical application development and delivery, in accordance with an exemplary embodiment of the present disclosure. System 100 can be implemented in hardware or a suitable combination of hardware and software, and can be one or more software systems operating on a general purpose processor.

As used herein, "hardware" can include a combination of discrete components, an integrated circuit, an application-specific integrated circuit, a field programmable gate array, or other suitable hardware. As used herein, "software" can include one or more objects, agents, threads, lines of code, subroutines, separate software applications, two or more lines of code or other suitable software structures operating in two or more software applications, on one or more processors (where a processor can include a microcomputer or other suitable controller, memory devices, input-output devices, displays, data input devices such as keyboards or mice, peripherals such as printers and speakers, associated drivers, control cards, power sources, network devices, docking station devices, or other suitable devices operating under control of software systems in conjunction with the processor or other devices), or other suitable software structures. In one exemplary embodiment, software can include one or more lines of code or other suitable software structures operating in a general purpose software application, such as an operating system, and one or more lines of code or other suitable software structures operating in a specific purpose software application. As used herein, the term "couple" and its cognate terms, such as "couples" and "coupled," can include a physical connection (such as a copper conductor), a virtual connection (such as through randomly assigned memory locations of a data memory device), a logical connection (such as through logical gates of a semiconducting device), other suitable connections, or a suitable combination of such connections.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

In the domain of CI, applications have to handle an ever increasing set of new devices and capabilities. When applications are delivered as a monolithic unit, changes or additions require rebuild of the whole application. In addition, it is hard to develop features independently due to the tight coupling. In an agile development process, it is optimal when application features can be developed end-to-end vertically and in parallel, by multiple scrum teams. System 100 is optimized to provide support for such end-to-end vertical and parallel development.

System 100 includes platform 102, which is a development platform that can be implemented across a number of networked devices, such as servers, desktop processors, laptop processors, tablet processors and other suitable devices. Application programming interface (API) 104 allows platform 102 to interface with other systems, components and devices. Session layer 106 provides a mechanism for opening, closing and managing a session between end-user application processes, such as by managing requests and responses that occur between applications, remote procedure calls (RPCs) or other suitable functionality.

System 100 further includes framework services 108 and deployment management 110. Framework services 108 include the services required to support vertical application development and delivery, and deployment management 110 includes the services required to deploy the applications within a network environment. Framework services 108 include core 112, task management 114, resource access 116 and utility services 118, and deployment management 110 includes deployment service 158, licensing 160 and connection 162.

Deployment service 158 provides dynamic deployment and upgrades using a business logic engine, and can deploy business logic, a custom Northbound API or external facing API (NBI), drivers, resource definitions and task definitions for a component. The scripting and service access capability can be used to provide access to dynamically added resources. In one exemplary embodiment, an Open Services Gateway Initiative (OSGi)-based container can be used to provide dynamic dependence management and basic device driver management, and an OSGi framework can be used to provide customized driver mapping. OSGi is a module system and service platform for the Java programming language that implements a complete and dynamic component model, and is available from the OSGi Alliance at <<www.osgi.org/>>. Although the service look up is not scalable in traditional OSGi, the present disclosure augments the framework with a database-backed scalable solution to allow in excess of one million services to be deployed, whereas existing OSGi implementations can only handle 100,000 device services. This additional capacity greatly extends the scale of the existing OSGi containers to allow the overall system to scale, and also handles in-service upgrades and new device types. For the presentation layer and external API, the framework combines a Web Services framework with OSGi dynamic deployment to allow applications to dynamically deploy and make a representational state transfer (REST) application interface available. The framework provides a deployment service to allow the discovery, registration and activation of all the extensible components: application logic, device drivers and north bound web endpoints. The framework defines deployment unit formats and provides validation, lookup, versioning control. Applications components will be packaged as deployment units and can be installed and activated in a running instance.

Core 112 provides meta model and data services in support of vertical application development and delivery. These meta model and data services include the following.

Query service 120—provides a query language and a query engine that allow ad hoc domain-specific query terms. Domain-specific query terms can correspond directly to concepts or entities in the application domain, so as to be intuitive to users. In one exemplary embodiment, the set of domain-specific query terms can be expanded without a change in the query language or the engine, to allow applications to easily accommodate domain changes without being rebuilt. After a new or changed domain model is deployed, the query engine can answer ad hoc new queries using new domain vocabulary corresponding to the newly deployed model, where the engine does not need to be provided with data defining the new domain model in advance of responding to the queries. To enable this functionality, the query engine and the back end can use an XML schema to model the domain and leverage XML path language (XPath) query support from the database. The query engine can translate query terms into Xpath queries and the queries can be answered by the database. This coupling of a domain-specific language and a flexible back-end model can be used to enable ad hoc domain-specific queries.

Logical constructs 122 include the business logic that an application will need to provide. In regards to the application platform, logical constructs 122 also provide the environment to define, deploy, execute and update the logic. In one exemplary embodiment, the logic can be implemented as Business Process Model and Notation (BPMN), a standardized logic model provided by Object Management Group at <<www.bpmn.org>>. Logical constructs 122 can further provide a graphical environment for defining and modifying the business logic. An OSGi bundle can be used to package, deploy and upgrade the logic dynamically. During runtime, the application platform can execute the logic. In another exemplary embodiment, the logic can include the following constructs:

Branch
Conditional (If-Then-Else)
Concurrent Action
Loop
Long running tasks with Asynchronous Continuation
Exception and Error Handling
Automatic Transaction/Compensation
Resource Access Endpoint In addition, hooks for a generic BPMN engine can be provided to access other services provided by the platform and applications, such as logging services, transaction services and device drivers.

Authentication, Authorization and Accounting (AAA) service 124—provides authentication, authorization and accounting configuration and integration into the agile framework for vertical application development and delivery. In addition, AAA service 124 can provide role management and user management, can manage certificates and can perform other suitable functions.

Tracking service 126 provides tracking functionality for applications, such as to track services that users are accessing for load management, scheduling, trouble-shooting or other suitable purposes.

Template/profiles service 128—provides a self-contained, extensible model for representing devices along with a consistent, well-defined set of semantics. These models contain both the data and logic. The extensible units can be added to, removed from, or upgraded within the framework independent of changes to other framework components, including other pluggable units. The extensible units, which can also be called "templates" or "resource models," can capture the state information modeled for the device. A "driver" can also be used to allow interaction with the device, and can be delivered as part of the pluggable resource model as executable code that adheres to a defined format, which enables it to be plugged in a fashion similar to templates and models. Models of real world devices can be implemented using these templates, which capture not only relevant state information but also required behavior to interact with the device, in order to both read device state and also to change it. The advantages of this approach are several. First, these self-contained models can be used to capture the data in a uniform manner, such as templates that are created in a framework-defined descriptive form that lists the structure and types of state information present on the devices. This configuration abstracts the template away from the implementation details of the framework which processes it. Second, this approach allows the device modeler to create an end-to-end representation of a device, which encapsulates the information and logic required to add support for a new device into a deployable unit.

Compensation service 130—allows the current state of a target resource to be gathered and stored, prior to initiating user-defined logic in a workflow or sub-workflow, which can be stored in memory, in a persistent database with transactional semantics or in other suitable manners. In the case of a failure within the workflow or a sub-workflow, the stored state can be used to restore the target devices to their pre-workflow state. A mechanism of error propagation is used whereby errors in sub-workflows are propagated to their parent workflow for processing. This extensible, well-defined framework provision for supporting transactional semantics for updating devices allows the 'heavy lifting' of the necessary mechanics of state maintenance (fetching state and restoring state as required) to be done by the framework, thus relieving the developer of what is typically an error-prone task. Workflows that utilize this transactional functionality benefit by recovering from errors in a more controlled and predictable manner.

License service 132—provides feature and bundle licenses, resource licenses and license management for a component.

Persistence service 134—coordinates the sending of requests in a user session consistently to the same backend server. In one exemplary embodiment, persistence service 134 can be implemented as an OSGi service that other services (such as query service 120 or task management 114) can invoke to persist and retrieve objects to and from a database. Persistence service 134 provides an extensible model which gives application developers the ability to extend the model without framework changes. For example, application developers can add their own definitions for resources, relationships, configuration templates or other functionality. There are also other persistence needs for users, tasks and other objects.

Discovery service 136—provides network protocols which allow automatic detection of devices and services offered by these devices on a computer network. Discovery service 136 allows a software agent to make use of the services of another software agent without the need for continuous user intervention.

Task management 114 provides management for user tasks, service tasks or other suitable tasks, and includes scheduling 140, policy/event 142 and workflow deployment 144, which are coordinated through orchestration 138. Scheduling 140 allows tasks to be scheduled at predetermined times, after predetermined events or triggers, or in other suitable manners.

Policy/event 142 provides a rule-based system where policies define what type of event patterns are of interest to the system, and what action should happen when the event patterns occur. The platform provides the mechanism to deliver event data to policy/event 142 and allows policies to be defined on a per message type/topic basis. In one exemplary embodiment, policy/event 142 can be implemented using the Business Rule Management System (BRMS) Dave's Recycled Object-Oriented Language (DROOL) policy engine or other suitable policy engines. Examples of events include: SNMP events from managed devices, events generated by platform services (exceptions, alarms, alerts) and events coming from external systems.

Orchestration 138 can be BPMN orchestration that uses standard notation to capture business logic and that is declarative, visualized and managed in one place. Orchestration 138 can also provide clear separation of design time and runtime, and can be used for the dynamic deployment of business logic.

Resource access 116 includes access 146, which utilizes discovery 148 and deployment 150 to provide access to resources for an appliance.

Utility services 118 includes transmit 152, security 154 and logging service 156, which provides utility services to an appliance.

Figure 2:
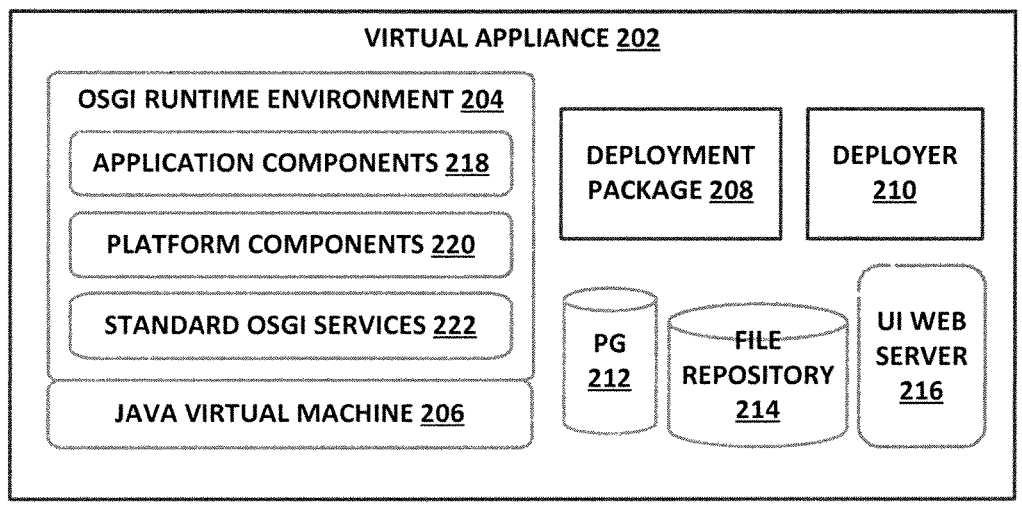
FIG. 2 is a diagram of system for providing a deployment environment for a virtual appliance in accordance with an exemplary embodiment of the present disclosure.

FIG. 2 is a diagram of system 200 for providing a deployment environment for a virtual appliance in accordance with an exemplary embodiment of the present disclosure. System 200 includes virtual appliance 202, which includes OSGi runtime environment 204, Java Virtual Machine 206, deployment package 208, deployer 210, PG (PostgreSQL) 212, file repository 214 and UI webserver 216, each of which can be implemented in hardware or a suitable combination of hardware and software.

Virtual appliance 202 is a virtual machine image running on a virtual platform that eliminates the installation, configuration and maintenance costs associated with running complex stacks of software. OSGi runtime environment 204 is a module system and service platform for the Java programming language that implements a complete and dynamic component model for the virtual appliance, and includes application components 218, platform components 220 and standard OSGi services 222. Application components 218 are provided for the virtual appliance in the form of bundles for deployment that can be remotely installed, started, stopped, updated, and uninstalled without requiring a reboot, where management of Java packages/classes is specified in great detail. Platform components 220 define what methods and classes are available for the different platforms that the virtual appliance will be supported on in the network environment. Standard OSGi services 222 provides a services layer that connects application component bundles in a dynamic way by offering a publish-find-bind model for Plain Old Java Interfaces (POJI), Plain Old Java Objects (POJO), or other suitable components.

Java Virtual Machine 206 is a virtual machine that is configured to execute Java byte code. Deployment package 208 defines deployment unit formats for the virtual appliance and provides validation, lookup and versioning control. Applications components can be packaged as deployment units and can be installed and activated in a running instance by deployer 210.

PG 212 provides persistent data storage. In one exemplary embodiment, PostgreSQL can be used, as well as other suitable data bases. PG 212 can be used to persist data such as device configuration, states, user information, logs, audit information, job history or other suitable data.

File repository 214 provides system access to virtual appliance files, and UI webserver 216 supports the user interfaces for the virtual appliance.

In operation, system 200 provides an alternative expression of selected aspects of the present disclosure. System 200 can be used as shown or in conjunction with the other exemplary features and embodiments disclosed herein.

Figure 3:
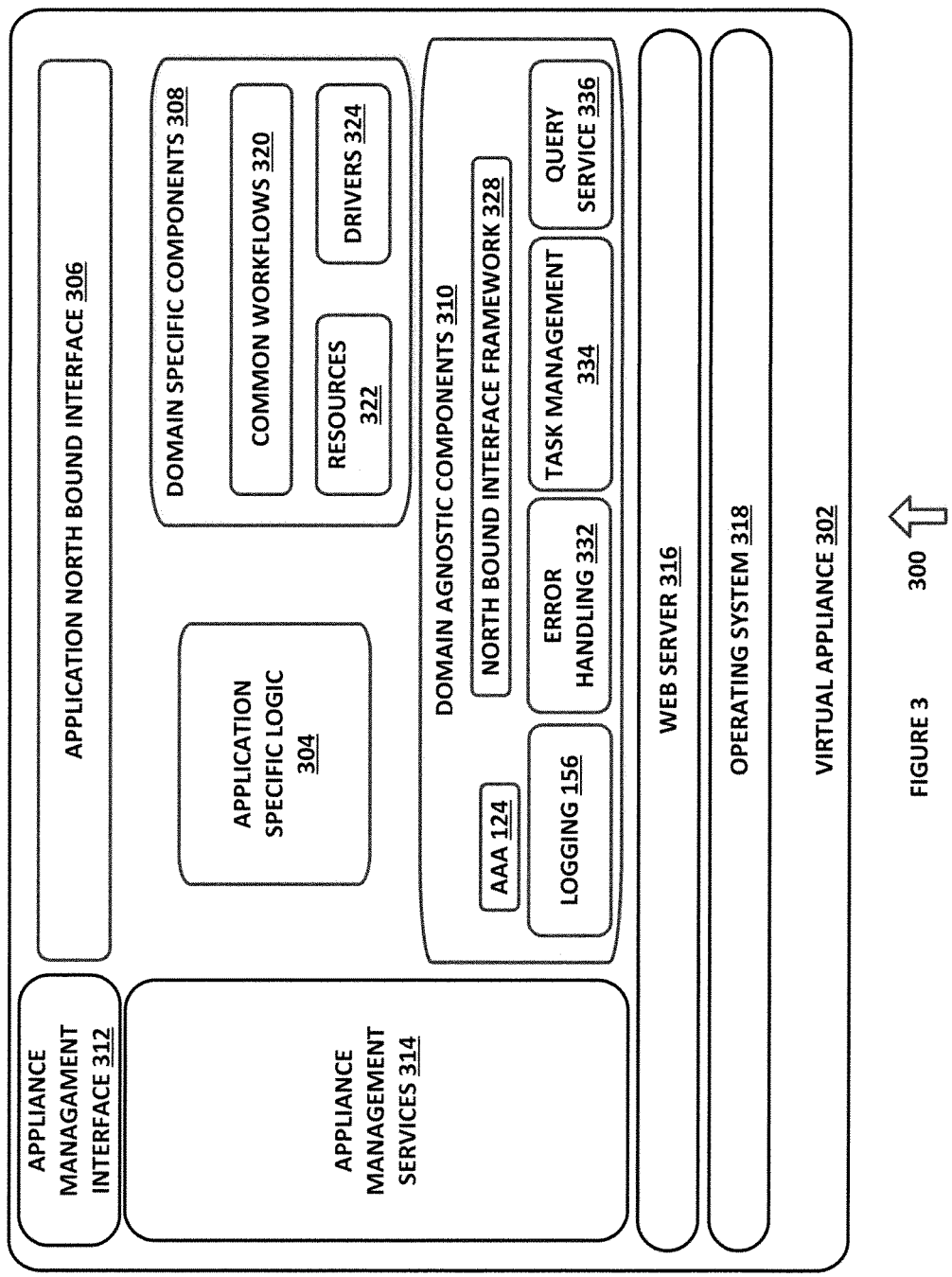
FIG. 3 is a diagram of system for providing an application stack for a virtual appliance in accordance with an exemplary embodiment of the present disclosure.

FIG. 3 is a diagram of system 300 for providing an application stack for a virtual appliance in accordance with an exemplary embodiment of the present disclosure. System 300 includes virtual appliance 302 which includes application-specific logic 304, application north bound interface 306, domain-specific components 308, domain-agnostic components 310, application management interface 312 and appliance management services 314, each of which can be implemented in hardware or a suitable combination of hardware and software.

Application-specific logic 304 of virtual appliance 302 includes the application-specific logic for virtual appliance 302, such as resource and driver models. Application-specific logic 304 defines its own domain-specific model and does not require a data access object layer. Virtual appliance 302 can deploy and is able to support the addition and removal of different domain-specific components 308 and the addition and removal of application-specific logic 304. When application-specific logic 304 is added or removed, that change can also affect the business logic 506, and can result in the addition or removal of configuration template 520, configuration fragment 522, configuration attribute pool 524, task request definition 526 and workflow definition 532. The components that track these changes and execute the new modules include task manager 530, workflow engine 528, resource configuration manager 518, discovery service 536, resource service 538 and inventory service 540.

Application north bound interface 306 is an application programming interface that is used to interface with the south bound interface of a higher-level component.

Domain-specific components 308 include common workflows 320, resources 322 and drivers 324 that are available within a predetermined domain, such as those using domain-specific queries, domain-specific terms, domain-specific templates and other domain-specific components.

Domain-agnostic components 310 include AAA service 124, northbound interface framework 328, logging service 156, error handling 332, task management 334 and query service 336. AAA service 124 provides a framework for intelligently controlling access to computer resources, enforcing policies, auditing usage, and providing the information necessary to bill for services. Northbound interface framework 328 identifies lower level details such as data or functions that are used within virtual appliance 302. Logging service 156 provides logging functions for virtual appliance 302. Error handling 332 provides error handling functions for virtual appliance 302. Task management 334 and query service 336 provide the associated task management and query service functions for virtual appliance 302.

Appliance management interface 312 provides an interface to an appliance for management applications. Appliance management services 314 provides services to an appliance.

In operation, system 300 provides an alternative expression of selected aspects of the present disclosure. System 300 can be used as shown or in conjunction with the other exemplary features and embodiments disclosed herein.

Figure 4:
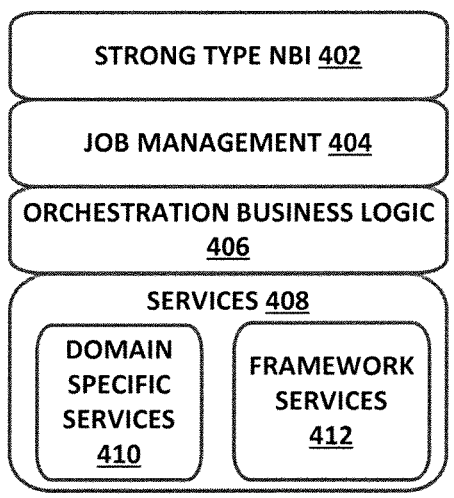
FIG. 4 is a diagram of a system for providing vertical development and delivery in accordance with an exemplary embodiment of the present disclosure.

FIG. 4 is a diagram of a system 400 for providing vertical development and delivery in accordance with an exemplary embodiment of the present disclosure. System 400 includes strong-type north bound interface (NBI) 402, job management 404, orchestration business logic 406 and services 408, each of which can be implemented in hardware or a suitable combination of hardware and software. Strong-type NBI 402 can include an application-pluggable REST API that is pluggable in the NBI and that matches end-to-end to business logic and device capability.

Job management 404 can be defined by the application and can include schedules, maintenance windows, triggers and other job management functionality.

Orchestration business logic 406 can be defined by business logic that is provided by the application and can include hardware assignments on boarding, workload deployment, compliance checking and other suitable orchestration business logic.

Services 408 can be implemented as OSGi services such as driver services, model services, framework services or other suitable services.

The disclosed framework allows rapid development of CI software applications in a manner that is optimized for an agile development environment. Software application features can be developed end-to-end, from the user interface to the south bound device drivers. Software applications can also be deployed as modular units, dynamically at runtime. This deployment capability enables in-service deployment and upgrade, and allows software applications to handle new devices or modify existing application logic dynamically without rebuild or even restart.

The present disclosure provides a framework that allows software application developers to deliver software applications by providing 1) a vertical stack of back end business logic, 2) a domain model and 3) a front end presentation, each of which can be deployed as modular units. The framework of the present disclosure also facilitates dependence management and dynamic deployment, and defines how application components in different layers of the stack should work with each other. These modules can be deployed into the application at run time, to add features, for upgrades, to fix problems or for other suitable purposes.

Existing technologies include software application servers, user interface (UI) frameworks and device driver adapter frameworks, which of each address certain parts of the software application stack. However, these existing technologies do not allow end-to-end, testable features of the software application to be delivered. Software application developers have to work with multiple technologies and platforms to develop the different layers of the software application features, and dynamic deployment to allow in-service upgrades of the software application is not possible, or is limited to only part of the software application.

The disclosed framework extends and integrates a declarative business logic engine to provide a container to define and execute application-provided logic. Dynamic deployment and upgrade are handled by the business logic engine. The scripting and service access capability is enhanced to provide access to dynamically-added resources.

OSGi-based containers are used to provide dynamic dependence management and the basic device driver management. The OSGi framework is extended to allow customized driver mapping. In traditional OSGi, the service look-up is not scalable. The disclosed framework augments the OSGi service look-up with a database-backed scalable solution to allow a scalable number of services. Whereas existing OSGi service look-up implementations can only handle 100,000 device services, using the disclosed architecture allows over one million device services to be handled. This capability greatly extends the scale of the existing OSGi containers to allow the overall system to scale, and facilitates in-service upgrades and new device types.

For the presentation layer and north bound API, the framework combines a Web Services framework with OSGi dynamic deployment to allow applications to dynamically deploy and to make a REST application interface available. The framework provides a deployment service to allow the discovery, registration and activation of all the extensible components, such as application logic, device drivers and north bound web endpoints. The framework defines deployment unit formats, provides validation, lookup, versioning control and other suitable functions. Applications components can be packaged as deployment units and can be installed and activated in a running instance.

In operation, system 400 provides an alternative expression of selected aspects of the present disclosure. System 400 can be used as shown or in conjunction with the other exemplary features and embodiments disclosed herein.

Figure 5:
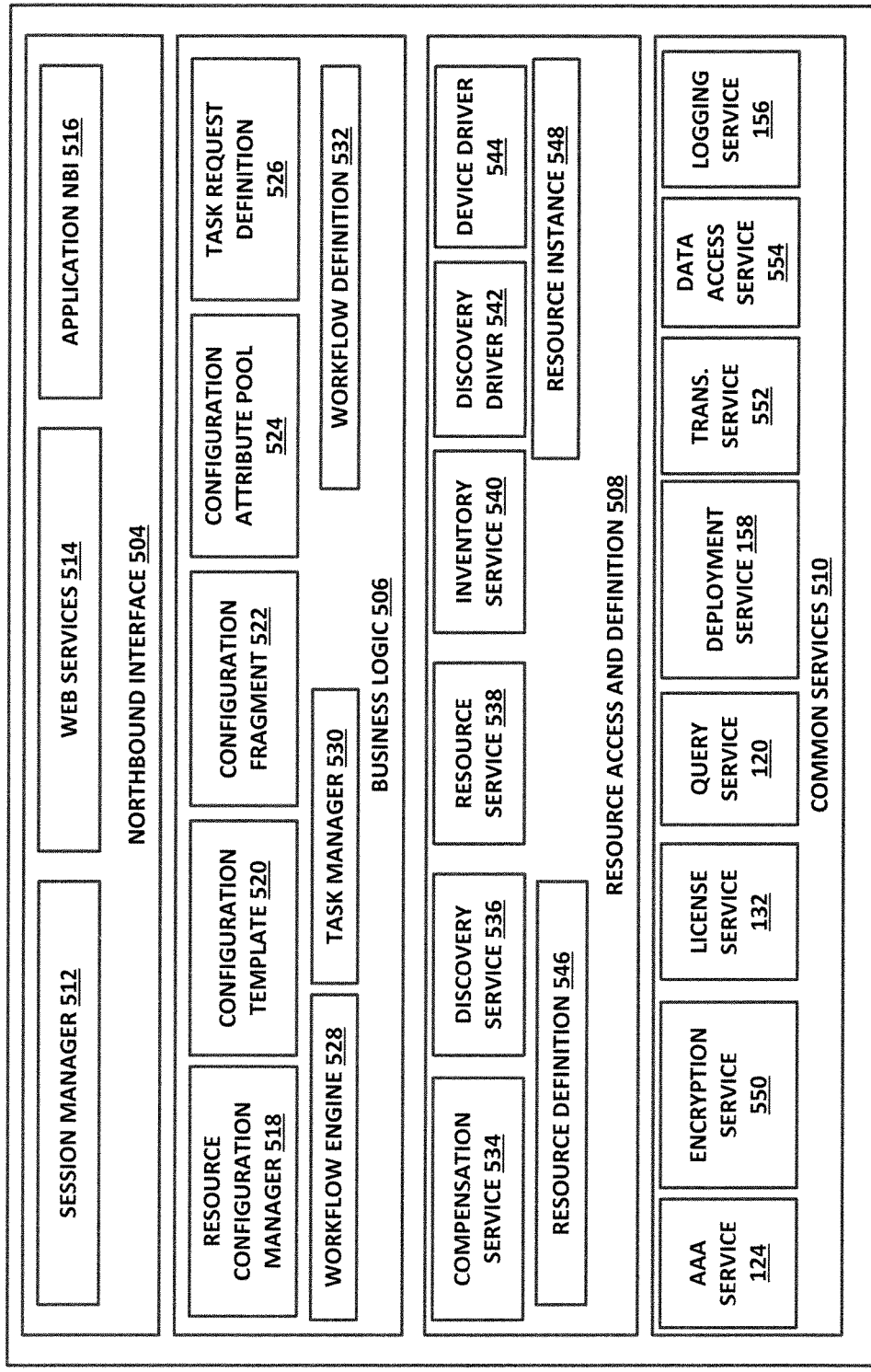
FIG. 5 is a diagram of component view in accordance with an exemplary embodiment of the present disclosure.

FIG. 5 is a diagram of component view 500 in accordance with an exemplary embodiment of the present disclosure. Component view 500 shows application features in the northbound interface 504, business logic 506 and resource access and definition 508 layers, as well as the relationship to common services 510, each of which can be implemented in hardware or a suitable combination of hardware and software.

Northbound interface 504 includes session manager 512 and web services 514, which can be implemented as system-level software applications, and application NBI 516, which provides application-specific interface functionality. Session manager 512 manages state data for a user session or other suitable sessions, such as to manage data buffers, variables or other attributes that define a user session. Web services 514 provide support for communications between software applications operating on different hardware devices, such as user devices and servers. Application NBI 516 provides application-specific interface functionality to higher layer functionality, such as user interface layers.

Business logic 506 includes resource configuration manager 518, workflow engine 528 and task manager 530, which can be implemented as system-level software applications, and configuration template 520, configuration fragment 522, configuration attribute pool 524, task request definition 526 and workflow definition 532, which provide application-specific business logic functionality. Resource configuration manager 518 establishes and maintains consistency of the functional and physical resources required for software applications, such as a configuration attribute pool, configuration grouping, policies, template and profile create, read, update and delete (CRUD), network communications, data storage and other resources.

Workflow engine 528 is a software application that manages and executes modeled computer processes, and typically makes use of a database server. Workflow engine 528 can provide compensation logic, perform error handling, perform logical branching, perform loop monitoring, perform parallel execution, perform verification of a current status, such as to check whether a command is valid in executing a task, can determine the authority of users, such as check if the current user is permitted to execute the task, can execute condition script, such as to evaluate condition script in-process to determine whether a condition is true or false, to take corresponding actions, or for other suitable purposes.

Task manager 530 can provide information about the processes and programs running on a computer, as well as the general status of the computer. Some implementations can also be used to terminate processes and programs, as well as change the processes priority. Task manager 530 can also monitor a task, pause a task, queue a task, recover a task, resume a paused task, schedule a task, start and stop a task and perform other suitable functions.

Configuration template 520 provides application-specific configuration templates, such as for file configurations.

Configuration fragment 522 provides fragment tracking for application-specific configuration program fragments, and can be a subset of a configuration template. Configuration fragment 522 can correspond to a logical grouping of configurations that form a reusable unit of configurations. In one exemplary embodiment for servers, a configuration fragment can be provided for virtualization settings in the BIOS that are optimized for running virtual machine monitors, whereas for switches, a fragment for port settings can be provided that allows converged traffic of storage and web.

Configuration attribute pool 524 can be used for identity pools such as IP address pools, worldwide port name (WWPN) pools, MAC address pools, Internet small computer system interface (ISCSI) pools, host name prefix pools or other suitable pools. In one exemplary embodiment, a template or fragment can be provided for an IP address IPAddress=from IP Pool P123456, which signifies that the IPAddress should be from a pool called P123456. At runtime, when the configuration is applied, resource service 538 code can obtain an IP address from this pool. In data centers, a central location can be provided to manage identities. Each group can get its own pool to optimize allocation and avoid any collision. In a virtualized environment, it is also important to provide a central location to manage identities, because the identity is not associated with physical hardware itself.

Task request definition 526 provides task request parameters in response to a task definition request.

Workflow definition 532 defines a workflow for a component. In one exemplary embodiment, the workflow can include processes, resources and services that are used to implement an appliance.

Resource access and definition 508 layer includes compensation service 530, discovery service 536, resource service 538, inventory service 540, discovery driver 542 and device driver 544, which are system level software applications, and resource definition 546 and device driver instance 548, which are application-specific software applications. Adding or removing a domain can affect resource access and definition 508 layer, because that can include adding or removing discovery drivers 542 and device drivers 544, along with resource definitions 546 and resource instances 548, all of which are domain-specific, and where a version of each one exists per domain.

Compensation service 530 can enlist resources, provide a nested compensation stack, perform rollback, obtain a snapshot of the current status and can perform other suitable functions.

Discovery service 536 can discover new resources given connection information, such as IP address and credentials. Resource service 538 can manage resource definitions, perform resource lifecycle management and obtain resource status data.

Inventory service 540 performs CRUD operations for a resource persistence state, resource service 538 and other suitable functions.

Discovery driver 542 is used by discovery service 536 to communicate with an unknown device to establish its identity.

Device driver 544 contains the logic to communicate with a specific type of device Resource definition 546 contains the state information for a type of resource.

Resource instance 548 is used by resource service 538 to communicate with a specific resource.

Common services 510 include AAA service 124, encryption service 550, license service 132, query service 120, deployment service 158, transaction service 552, data access service 554 and logging service 156, each of which are system level software applications.

Encryption service 550 performs encryption, decryption and signing of data for appliances.

Transaction service 552 performs distributed transaction processing for appliances and can obtain a transactional snapshot for a transaction as needed by an appliance or for other suitable purposes.

Data access service 554 provides data access objects for the framework core and resources as needed by an appliance.

Logging service 156 performs activity, audit and trace logging, and provides log services as needed by an appliance.

In operation, component view 500 provides an alternative expression of selected aspects of the present disclosure. Component view 500 can be used as shown or in conjunction with the other exemplary features and embodiments disclosed herein.

Figure 6:
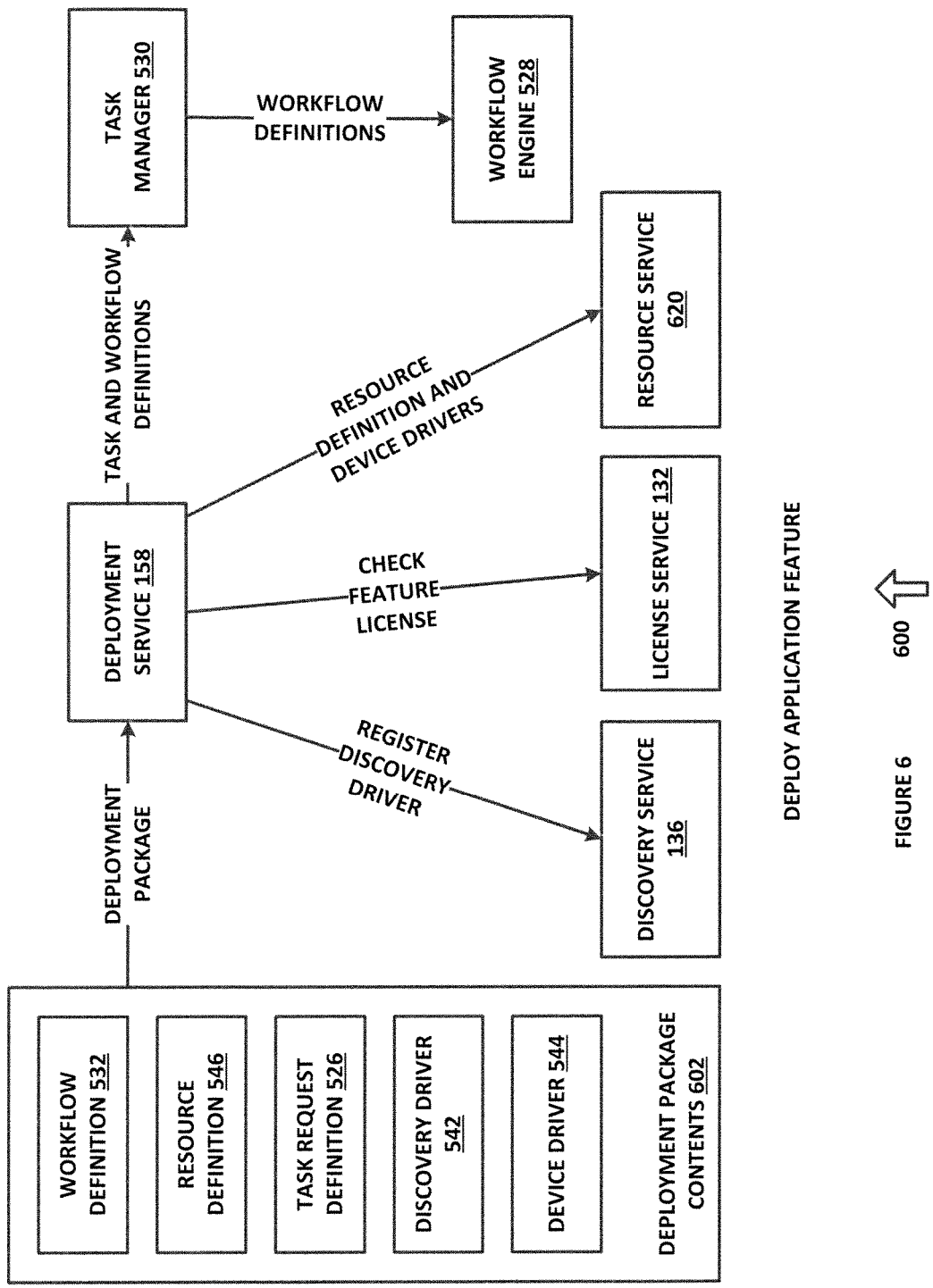
FIG. 6 is a diagram of a process for deploying an application feature in accordance with an exemplary embodiment of the present disclosure.

FIG. 6 is a diagram of a process 600 for deploying an application feature in accordance with an exemplary embodiment of the present disclosure. Process 600 can be implemented in hardware or a suitable combination of hardware and software, and can be one or more software applications operating on a processor platform.

Process 600 begins at 602, where deployment package contents are generated. In one exemplary embodiment, the deployment package contents can include workflow definition 532, resource definition 546, task request definition 526, discovery driver 542, device driver 544 and other suitable components. The deployment package is then provided to deployment service 158, which manages deployment of the deployment package. In one exemplary embodiment, deployment service can register the discovery driver through discovery service 136, can check feature licenses through license service 132, can obtain resource definitions and device drivers through resource service 620 and can perform other suitable functions. The task and workflow definitions are then provided to task manager 530, which performs task management for the tasks associated with the application. Task manager 530 also provides workflow definitions to workflow engine 528, which processes the workflow definitions for the feature.

Figure 7:
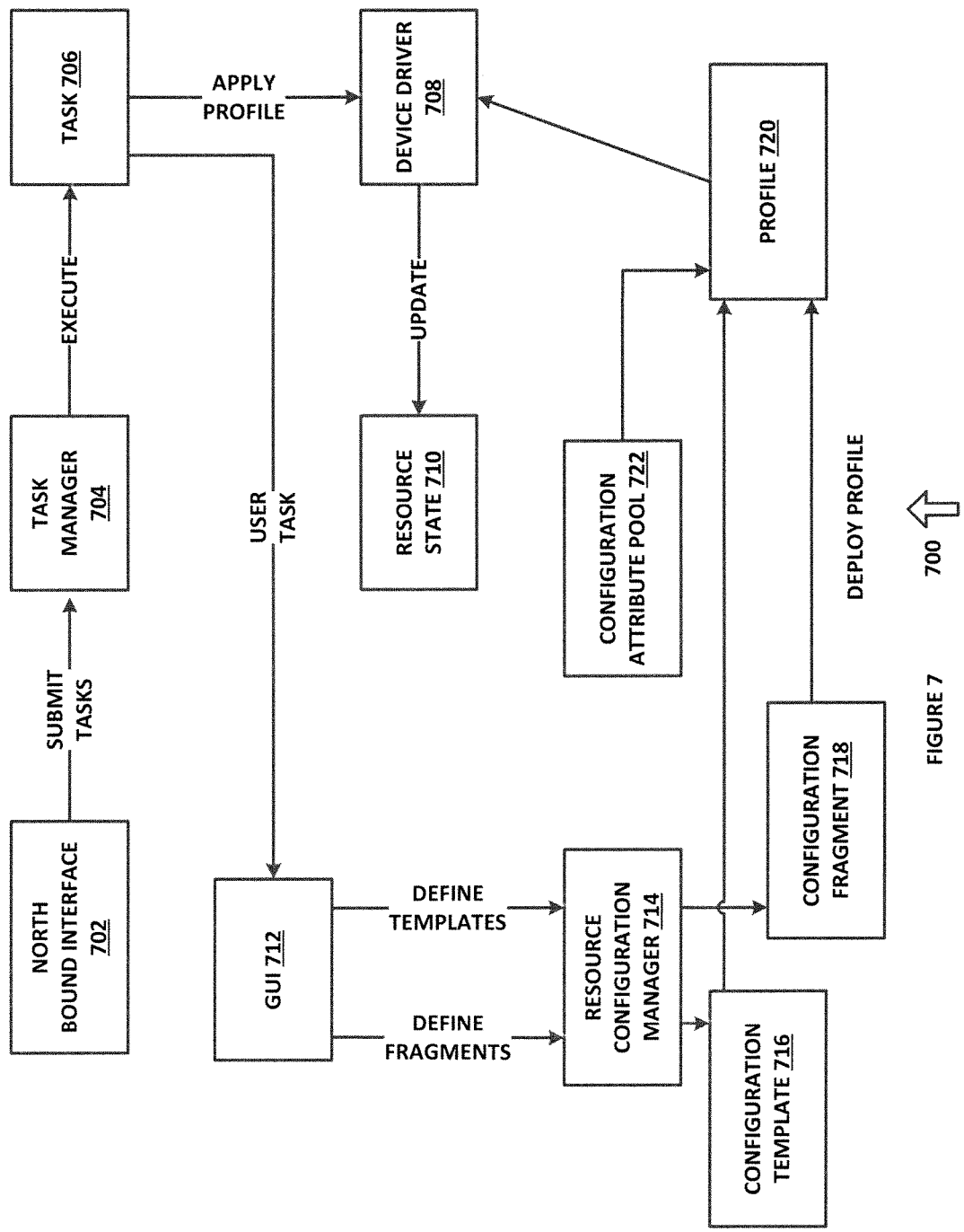
FIG. 7 is a diagram of a process for deploying a profile in accordance with an exemplary embodiment of the present disclosure.

FIG. 7 is a diagram of a process 700 for deploying a profile in accordance with an exemplary embodiment of the present disclosure. Process 700 can be implemented in hardware or a suitable combination of hardware and software, and can be one or more software applications operating on a processor platform.

Process 700 begins at 702 where a northbound interface submits tasks to a task manager at 704. The task manager executes the task at 706, and a profile is applied to a device driver at 708 and a user task is implemented through a user interface at 712. The user interface is used to define fragments and templates, which are provided to a resource configuration manager at 714. Configuration templates are provided to a profile at 716 and configuration fragments are provided to the profile at 718. The profile also receives configuration attribute pool 722, and the profile is provided to the device driver at 720. The device driver updates the resource state at 710.

Figure 8:
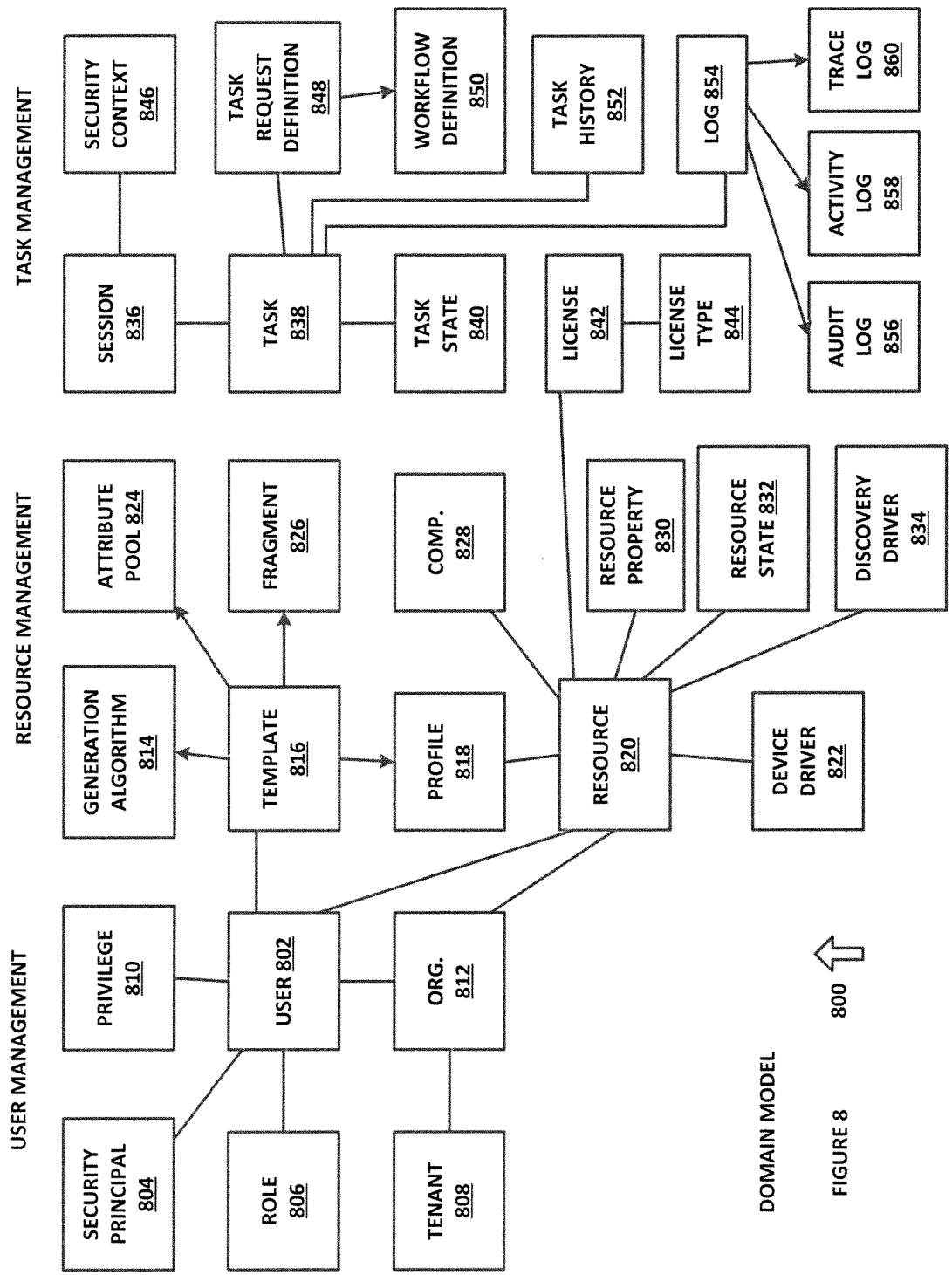
FIG. 8 is a diagram of a domain model in accordance with an exemplary embodiment of the present disclosure.

FIG. 8 is a diagram of a domain model 800 in accordance with an exemplary embodiment of the present disclosure. Domain model 800 can be implemented in hardware or a suitable combination of hardware and software, and can be one or more software systems operating on a processor.

Domain model 800 includes a user management layer, a resource management layer and a task management layer. The user management layer includes a user 802, which has associated privileges 810, security principals 804, roles 806, organizations 812 and tenants 808, which define the user 802, and which can be declarative logic to allow them to be edited without requiring recompilation.

The resource management layer is associated to user 802 through templates 816, which have associated generation algorithms 814, attribute pools 824 and fragments 826. The resource management layer is also associated to user 802 through resources 820, which have associated device drivers 822, discovery drivers 834, resource states 832, resource properties 830, licenses 842 and compensation 828, and which are also associated with profile 81 and organizations 812.

The task management layer includes tasks 838, which are associated with sessions 836, and which have associated task states 840, task request definitions 848, task histories 852 and logs 854. Sessions 836 have associated security contexts 846. Task request definitions 848 have associated workflow definitions 850. Logs 854 have associated audit logs 856, activity logs 858 and trace logs 860. Licenses 842 with associated license types 844 are also in the task management layer.

In operation, domain model 800 provides an alternative expression of selected aspects of the present disclosure. Domain model 800 can be used as shown or in conjunction with the other exemplary features and embodiments disclosed herein.

The present disclosure facilitates a number of additional applications:

1. Extensible Data Model and Service for Infrastructure Management.

Device representations (such as device capabilities, definitions and states) and configurations within a computing infrastructure can be defined as data objects and persisted, and a data model can be used to manage the persisted device definitions, states and configurations. Device representations and configurations vary widely among vendors and generations of devices, and there are typically a large number of available devices. The present disclosure can be used to provide a method to handle the diverse, changing representations and relationships between these data objects. The present disclosure also allows an incremental and rapid development process to be used to respond to rapidly changing requirements, and to allow multiple teams to develop a domain-specific data model in parallel. The absence of such capabilities cause maintenance issues in the field, create a development bottleneck and result in a static set of devices or features.

The present disclosure can be used to provide a data service to allow adding or changing of the representations and relationships between devices for use with applications without requiring rebuilding of the applications, by providing a core, extensible data model that can be incrementally extended for applications to add and modify device types and to add and modify new relationships. A domain-specific model can be defined for each application and the model can be deployed into the processing environment core (which is typically a number of interrelated applications that provide common services) without the need to rebuild or recompile the applications that make up the processing environment core. Using the present disclosure, application models can be developed independently and in parallel of each other, to allow developers to respond quickly to new requirements, and to help streamline operations by multiple teams that can be developing applications in parallel on the same platform. Using the present disclosure, application extension data models can be deployed at runtime, such that no downtime is required for data model changes, which allows applications models to be developed in parallel.

The data service of the present disclosure provides methods for applications to perform CRUD operations on their domain-specific objects. In this regard, code is not required for applications, which can be implemented by providing schema for the data models for the application that define device representations and relationships. The data service can provide the CRUD operations through a standardized API, can preserve atomicity, consistency, isolation and durability (ACID) properties, can maintain data integrity and can manage transactional behavior across data operations.

In contrast, existing solutions try to provide a complex and hard-to-maintain data model. The upfront development effort for such a model is hard to implement incrementally and not suitable for an agile environment. The complexity of the model is not encapsulated from the application developers. If anything is left out in the model, the upgrade will usually involve a complex data migration process. Upgrades can also cause backward compatibility issues, and application rebuild and upgrade downtime is unavoidable. While noSQL options are available for handling semi-structured data, they require a significant amount of application code to perform indexing, joins, and to maintain referential data integrity. Many of the noSQL solutions do not provide the full ACID properties that are required for storing infrastructure configuration and states.

The present disclosure can be used to provide a generic resource with a type that is defined by an XML schema, which allows applications to define new types and deploy them on the fly. Relationships between resources are defined in meta data that is managed by the data service, which allows dynamic addition and modification of relationships between resources. No schema changes or downtime occurs during these modifications, and the meta data also allows the data service to process relationships. The solution provided by the present disclosure scales well with functional indexing that allows indexing into the XML payload, which significantly improves query time.

2. Ad Hoc Domain-Specific Query for System Management.

In system management, the domain-specific vocabulary (taxonomy) changes and expands rapidly with the introduction of new devices and device capabilities. System management software cannot look ahead to include the unforeseen expansion of the taxonomy, and instead typically provides canned queries that only capture the known taxonomy at design time. The system management software then needs to be periodically upgraded to expose new queries or APIs to catch up with changes, otherwise, it will be outdated quickly. These upgrades involve costly software development and upgrade cycles. To minimize potential costly changes, applications sometimes use generic terms or artificial placeholders. These models are usually abstract and are not intuitive to end users.

The present disclosure includes a query language and a query engine that allow ad hoc domain-specific query terms. These domain-specific query terms correspond directly to concepts or entities in the application domain that are intuitive to users. The set of domain-specific query terms can be expanded without changing the query language or the engine, which allows applications to easily accommodate domain changes without being rebuilt. After the new or changed domain model is deployed, the query engine can answer ad hoc new queries using new domain vocabulary that corresponds to the newly deployed model. The engine does not need to be provided with data defining the new domain model in advance.

To enable this functionality, the query engine and the backend use XML schema to model the domain and leverage XPath query support from the database (XPath is a query language for selecting nodes from an XML document that was defined by the World Wide Web Consortium (W3C)). The query engine translates query terms into Xpath queries that are answered by the database. This coupling of a domain-specific language and a flexible backend model enables ad hoc domain-specific queries.

Existing entity relational-based solutions can handle unknown future terms or expansion terms by creating artificial columns or placeholders, but it is difficult to use and maintain the mapping. Furthermore, domain-specific query terms cannot be supported. These existing entity relational-based solutions typically require development and data migration when the domain model changes. The disclosed domain-specific API allows canned domain-specific queries, but that approach is not standards-based and also requires a new API for new queries, and as such, is not suitable for ad hoc queries.

The present disclosure uses a query language that is based on the Java Persistence Query (JPQ), which is a platform-independent object-oriented query language defined as part of the Java Persistence API (JPA) standard, with extensions for traversing nested model structures, and which can accommodate filters and expressions using domain-specific terms. The query engine can translate the query into a native database query. There is no mapping file required, such as is used in Hibernate or OpenJPA. The engine can also work with multiple backend query services. A dynamic mapping of query terms to query services is provided by the query service. The present disclosure leverages the flexible modeling provided by the XML schema and database support of Xpath query and indices, which allows ad hoc queries when coupled with the query language.

3. Declarative and Pluggable Business Logic for Systems Management.

A system management platform hosts a wide variety of services. Applications written on top of the system management platform utilize a workflow to express the logic that stitches together several services in order to execute a use-case. The framework of the system management platform of the present disclosure supports plugging in these workflows or application-specific jobs in the running system. In addition, application developers and solution developers can add new workflows or jobs in a declarative manner, so that the workflow definition can be modified if the underlying business needs change.

The present disclosure combines the standardization, familiarity and declarative nature of BPMN with a service oriented, resilient, and agile framework, which allows application or solution developers to author new jobs or workflows in standardized BPMN syntax, such that the framework can automatically process these artifacts during deployment, leveraging dynamic deployment of OSGi. Each new job can be assembled in a separate bundle and deployed to the system running the framework, because the framework can automatically find new jobs and process them for later execution. This synergistic combination of declarative logic in standard notation and dynamic deployment services results in a system that provides a fully-integrated environment where new requirements can be translated into business process changes, then into design, and then into implementation and deployment.

The present disclosure splits each new job or workflow into a job definition and a job model. The job definition contains a declarative BPMN representation of the business logic, and the job model contains input data needed for the job execution. The new job or workflow is then deployed as separate bundles in the OSGi-based framework, and OSGi bundle listeners listen to these new jobs bundles. An open source BPMN engine such as jBPM or Activiti can be used to validate and process the declarative job definitions.

4. Pluggable Models and Pluggable Templates.

In the domain of CI, applications face an increasing number and variety of devices which need to be accommodated in order to meet business and marketplace requirements. Traditionally, applications have utilized a number of different approaches to mitigate the problem of integrating new devices. However, for the most part these approaches suffer from several problems. First, there is frequently a higher than desired degree of coupling between the device-specific components and the remaining system components, which impedes adding new devices or changing existing ones. Second, data defining device attributes and behavior often ends up being distributed across components and layers, which makes changing such data difficult. For example, it is not uncommon for there to be multiple representations of device types within the same system, none of which fully captures the state and semantics associated with the device and separates it from the other framework components.

The present disclosure utilizes a mostly self-contained model for representing devices along with a consistent, well-defined set of semantics. These units can be added to, removed from, or upgraded within the framework independent of changes to other framework components, including other pluggable units. These declarative units, called "templates" and "resource models" capture the state information that is modeled for the device. In addition, a "driver" is also provided to allow interaction with the device. This driver is delivered as part of the pluggable resource model, as executable code which adheres to a defined format and which enables it to be plugged in a fashion similar to templates and models.

Using the present disclosure, developers can create models of real world devices which capture not only relevant state information but also required behavior to interact with the device in order to both read device state and also to change it. There are numerous advantages to this approach. First, a mostly declarative model is used where possible. For example, templates are created, in a framework-defined descriptive form, that list the structure and types of state information present on the devices, and which abstracts the template away from the implementation details of the framework that processes it. Second, the present disclosure enables the device modeler to create an end-to-end representation of a device, which encapsulates the information and logic required to add support for a new device into a deployable unit.

5. Undo Configuration Transactional Compensation.

One function of the disclosed CI management system is to allow administrators to apply changes to the state of managed devices in a well-defined manner. These changes can be due to required updates, to remediate compliance violations, or for a variety of other reasons. The changes can be accomplished in a variety of ways, but typically involve logic which defines the operations and input to perform against the set of target resources. The logic can be composed of multiple steps or activities that are executed in a particular order, which achieves the desired state changes. In the case where one or more of these steps fails, it is desirable to restore the state of the target devices to that which existed prior to the start of the operation, in order to avoid leaving devices in an indeterminate or broken state. In short, it is desirable that the activities and sub-activities in a "job" being run by an administrator to update devices are capable of having transactional semantics, to the extent possible.

The framework of the present disclosure allows for user-defined workflows to be deployed for execution. These workflows can be composed of smaller workflows nested to the level required by the business logic. Each of these sub-workflows has a well-defined start and end point to which the workflow execution engine has access and into which logic may be added. In addition, the framework maintains representations of the resources (devices) which have the ability to read and write state. The workflow and sub-workflow boundaries can be augmented to allow for automatic state maintenance, and to support transactional semantics. Participation in transactional semantics is optional and can be on a per-workflow or sub-workflow basis. Specifically, prior to actually initiating the user-defined logic in a workflow or sub-workflow, the current state of the target resources can be gathered and stored in memory, in a persistent database with transactional semantics, or in other suitable manners. In the case of a failure within the workflow or a sub-workflow, the stored state can be used to restore the target devices to their pre-workflow state. In order to fully support this functionality, a mechanism of error propagation is provided whereby errors in sub-workflows are propagated to their parent workflow for processing. There are numerous benefits to having an extensible but well-defined framework for supporting transactional semantics for updating devices. First, the 'heavy lifting' of the necessary mechanics of state maintenance (fetching state and restoring state as required) is done by the framework, thus relieving the developer of this error-prone task. Also, for end users, workflows that utilize this transactional functionality benefit by recovering from errors in a more graceful, controlled and predictable manner.

6. Model Based Development.

Much of contemporary traditional software development follows object-oriented practices in order to achieve the goals of higher quality, ease of maintenance, and ease of testing, among other objectives. In general, this approach does tend to afford these benefits to one degree or another. This method typically involves analyzing requirements designing and decomposing components and their interactions and then writing code in an object-oriented style that represents the components using the language and tools of choice. This approach, while better than older procedural style approaches, still centers around code artifacts (objects or classes) as the fundamental building block of the system. There are cases where such an approach has drawbacks, such as the case of highly extensible frameworks. As extensions are made to the framework, much new code has to be added, such as domain data objects and other 'helper' objects which perform various operations and transformations within the framework. This process is time-consuming, tedious and error-prone, particularly where the framework is designed to be extended by end users and/or non-programmers.

The present disclosure provides model-based development that uses model artifacts as the basis of the development process. In the case where a system or framework is specifically designed to be extended by end users and/or non-programmers, model-based development offers improved ease of development. Model-based development is not a replacement for object-oriented development, but can utilize object-oriented development as a foundation.

In one exemplary embodiment, the models are self-contained and extensible in nature and use a standard, well-known representation, such as XML and XML Schema. These model artifacts can be a description of the objects being added to the system and can contain embedded metadata to aid in their processing, either by tools or by the framework. These models can be processed by tools to generate code or code-related artifacts, such as object classes, helper classes, transformation classes, message files, validation classes or other suitable data. Code can also be generated from these models and inserted into other existing code artifacts. The models can also be processed to produce other useful artifacts such as documentation, diagrams, and the like. While the model itself can be abstract in nature, it is the central artifact from which supplementary processing is performed to generate code, documentation, tests and other suitable items or functions. There are numerous benefits to the disclosed embodiments. In the case of end user/non-programmer extensible systems, these models are significantly easier to work with and to understand. Second, code, documentation and test artifacts can be generated based on these models, such that changing only the model and re-processing it can be used regenerate these updated ancillary artifacts, saving time and effort.

7. Domain to Framework Transformation

The disclosed framework is extensible in order to serve as a platform upon which CI software can be built. New user-defined object models are allowed to be added to the system at runtime and without a framework recompile and restart. The representational form of these models, such as resource templates and resources, are written in a domain-specific manner. For example, in the case of user-defined templates, while the general format can be XML, the actual model content can contain identifiers which are specific to a resource. The structure of these model artifacts can also be specific to the domain resource. In this form, they are opaque to the framework as the framework has no knowledge of their specific format and contents. The framework can thus be agnostic of any particular structure and content, allowing template developers to express the business requirements of their templates in a domain-specific manner. There are points both within the framework and at framework boundaries when these models must be transformed into a format that is comprehensible by the framework for processing. These points can include framework-defined validation, returning model representations as the result of fetch or query, persistence, and other suitable points.

The present disclosure can utilize different methods to enable this translation. For resource templates, an XML schema-based approach can be used. In this manner, developers of templates can use XML and XML schema as the representational form of their template model. Further, the XML and schema can be derived from a framework-defined schema by 'restriction' and 'substitution'. Restriction allows the template developer to restrict one of a set of broader possible model elements defined in the framework-defined base schema. The restriction mechanism constrains template developers to a set of primitive model types and elements known by the framework. Substitution allows XML identifiers to be substituted (or serve as aliases) in the user-developed template model. The substitution mechanism allows the domain-specific XML identifiers in the user-developed template to be translated into known identifiers present in the framework-defined base schema. Taken together, restriction and substitution allow users to develop template models in a domain-specific manner which makes sense to them while still enabling them to be transformed automatically into a form which can be understood by the framework for processing. The code to perform this transformation is generated automatically from the template model itself, thus saving time and reducing errors.

8. Temple Derivation—Configuration Object Management.

In the disclosed framework, templates can be domain models of the updatable attributes of a particular resource type. Templates can be used as input to effect state change(s) on target resources. Templates define attribute names, types and other metadata such as default values, whether the value is 'fixed' (i.e. constant), if fixed, the actual fixed value and other suitable parameters. In contrast, a resource can be a full representation (from a framework perspective) of a real-world device or endpoint, including not only updatable attributes but also read-only attributes. As templates are developed within an organization, the proliferation of such templates can become problematic, both in terms of number and content. Also, requiring users to write templates from scratch would be too burdensome. Finally, without a programmatic method to create one template based upon an existing template, the process of writing and adapting templates to fulfill the needs of an enterprise is expensive and error prone, resulting in much duplication of effort and content.

In the disclosed framework, a process known as 'template derivation' is used to address these issues. A template can be derived from an existing template by 'fixing' attributes. An attribute marked as 'fixed' cannot have its value changed from its associated fixed value, such that a derived template is a copy of a previously existing template with one or more previously 'unfixed' attributes marked as fixed and given an associated value. Fixing of attributes can be done programmatically as well in the following manner. A caller can specify an existing template to begin the derivation process. The system can then identify attributes from this template that are not fixed, such as in a list. From this list, the caller can choose one or more attributes to mark as fixed and to provide an associated value. The list can then be returned to the framework and a new template can be created with the changes incorporated. It should be noted that the same template can be chosen as the basis for any number of derived templates. These derived templates can themselves then be further derived.

There are numerous benefits to this process. First, the process of derivation can be a process of increasing constraint, where a derived template has more fixed values than the template from which it was derived. In one exemplary embodiment, base templates can be provided 'out of the box' with no fixed values, and further refinements can be made to accommodate further specificity. In this exemplary embodiment, the first derivation of a server template can be to specify a minimum BIOS level, RAID level, virtualization settings or other settings. From this first derivation, several other templates can be derived which specify other attributes which are appropriate to particular sub-organization needs, such as templates for quality assurance servers, development servers and other suitable needs.

A strict definition of derivation allows for well-defined programmatic changes to templates that can be used to ensure that the derived templates will be compliant with framework requirements, but which enables the derivation to be presented in a form that an end user can understand. For example, a simple list of attributes could be displayed in a GUI with selection controls to allow a user to mark attributes that are to be fixed). This process can be used to enable non-programmers to derive new template models per their needs without having to understand the underlying XML or schema representation.

Figure 9:
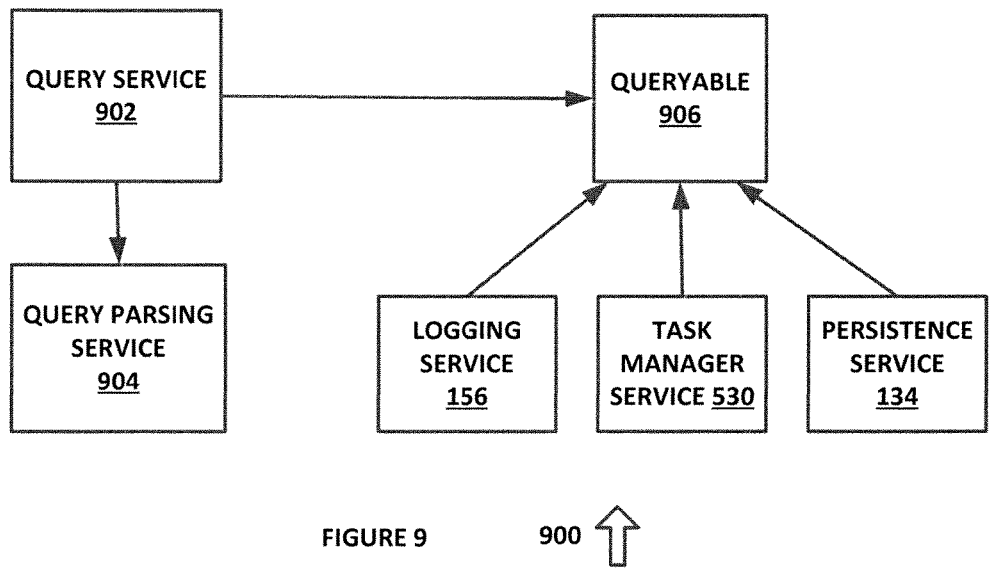
FIG. 9 is a diagram of a process for ad hoc query processing in accordance with an exemplary embodiment of the present disclosure.

FIG. 9 is a diagram of a process 900 for ad hoc query processing in accordance with an exemplary embodiment of the present disclosure. Process 900 can be implemented in hardware or a suitable combination of hardware and software, and can be one or more software systems operating on a processor.

Process 900 begins with query service 902, which receives an ad hoc query request from a north bound interface of an application or module, or in other suitable manners. Query service 902 performs cross-module common services, such as validating the query string, parsing the query string for processing by a semantic module, security checking and other suitable functions. Query service 902 then identifies the corresponding service by matching domain-specific key words to registered services implementing queryable 906 interface, which supports a given key word in the query domain specific language (DSL). Also shown are exemplary services logging service 156, task manager service 530 and persistence service 134, which execute the query and return the associated response data for the query.

In one exemplary embodiment, query service 902 can be implemented using the following query language syntax:

```
[SELECT [DISTINCT] {<fromAlias> | <joinAlias>}]
FROM {<modelClassName>| GENERICRESOURCE} [AS <fromAlias>]
[[REVERSE] JOIN {RELATION.<relationType>} AS <joinAlias>
    [ON {({<joinAlias>.[RESOURCETYPE] = 'rValue'} [AND])}*]*
[WHERE {<fromAlias> | <joinAlias>} <operator< <rValue>]
```

The disclosed syntax is similar to Java Persistence Query Language (JPQL) syntax, but does not support all clauses/patterns such as HAVING, GROUP BY, ORDER BY. Only identifiers mentioned in the FROM and JOIN clause above are supported, and the ON clause is not supported by JPQL. The reserved keywords (in bold) are domain specific, and literals in bold are keywords and are reserved. The set of domain specific keywords can be dynamically expanded with matching queryable 906 services supporting the concepts. For example, NetworkIOModule can be added as a new resource type with the corresponding service that implements the queryable 906 interface for NetworkIOModule resource type, as shown below:

```
SELECT iom.location FROM NetworkIOModule AS iom
    WHERE iom.model = 'S4810'
```

Native Query:

```
SELECT iom.location
FROM NetworkIOModule AS iom
WHERE(CAST((xpath('/*/model/value/text( )',iom.payload))[1] AS
    VARCHAR) = 'S4810')))
```

In this example, NetworkIOModule is a resource type and it has a model attribute. The system does not need to know these concepts beforehand. They can be introduced to the system by deploying the model for NetworkIOModule in the system and registering a service supports querable interface that will handle NetworkIOModule resource type. In such a way that the system will be able to expand the domain language without recompiling or even restarting.

Identification variables must not be a reserved identifier. The underlined fragments are case-sensitive. Likewise, other suitable query language syntax can also or alternatively be used, such as a syntax that is different from the one provided above but which provides the same or similar functionality.

For the SELECT clause, query service 902 can return a complete model object and does not support projecting selected attributes. In the SELECT clause, the application developer can specify the alias of the model in the FROM or JOIN clause to be returned. DISTINCT ensures that query service 902 returns a unique set of objects.

The FROM clause can refer to any persistable model classes in the system. An alias can be required if there is a predicate in the WHERE clause that refers to the model. GENERICRESOURCE can be the reserved keyword to query resources based on their unique identifier.

For the JOIN clause, joining to entities related to the model object in the FROM clause can be allowed. The relationships direction can be controlled by keyword REVERSE. In the absence of REVERSE keyword, the relationship can be traversed left-to-right. The REVERSE keyword indicates that the relationship needs to be traversed from right-to-left.

Persistence service 134 allows many-to-many relationships between models. These relationships can be stored in a relation table or in other suitable locations. REVERSE joins returns all relationships where the source model specified in the FROM clause is on the right column in the relation table.

All JOINs can be implemented as INNER JOINs, and there can be more than one JOIN in a query.

JPQL does not support an ON clause, because it has fixed relationship types (1-1, 1-m, m-1, m-n). Persistence Service 134 allows ad-hoc relationship types and it does not know the meaning of these relationships (for example persistence service 134 does not know that a parent-child relationship requires that there could be only a single parent for any children). As such, a mechanism is needed to specify JOIN conditions. The ON clause (similar to SQL JOIN ON clause) allows application developers to specify JOIN conditions. These conditions can be of two types. The condition on RESOURCETYPE instructs to allow only those relationships in which the other end model is of particular type.

The WHERE clause specifies conditional expressions that can be used to filter objects that do not satisfy the conditions. Note that WHERE clause can contain full XPATH expression of the attribute in the condition.

Figure 10:
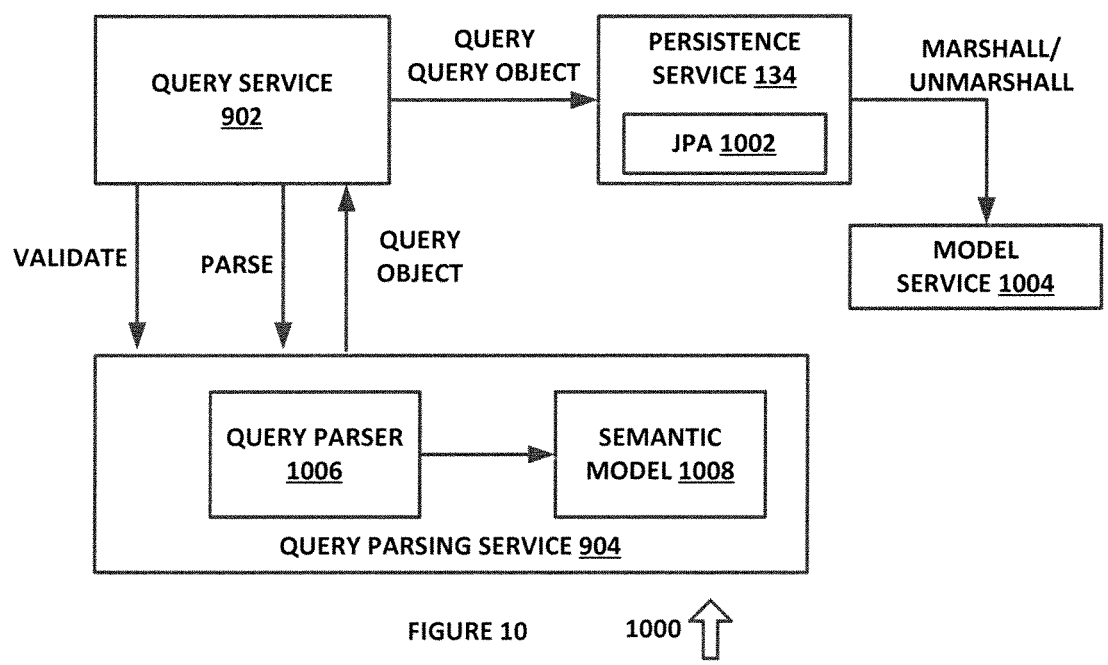
FIG. 10 is a diagram of a process for ad hoc query processing in accordance with an exemplary embodiment of the present disclosure.

FIG. 10 is a diagram of a process 1000 for ad hoc query processing in accordance with an exemplary embodiment of the present disclosure. Process 1000 can be implemented in hardware or a suitable combination of hardware and software, and can be one or more software systems operating on a processor.

Process 1000 begins when query service 902 receives a query in a domain specific language, such as from application north bound interface 306 or other suitable queries. Query parsing service 904 is called to validate and parse the query. Query parsing service 904 constructs a query object using semantic model 1008 if parsing is successful. The query object is returned to persistence service 134, which translates the query object into a native query or queries and executes the native query or queries. After the native query is executed, a persistence layer unmarshals payload XML into resource/template model objects and return them to the caller.

Figure 11:
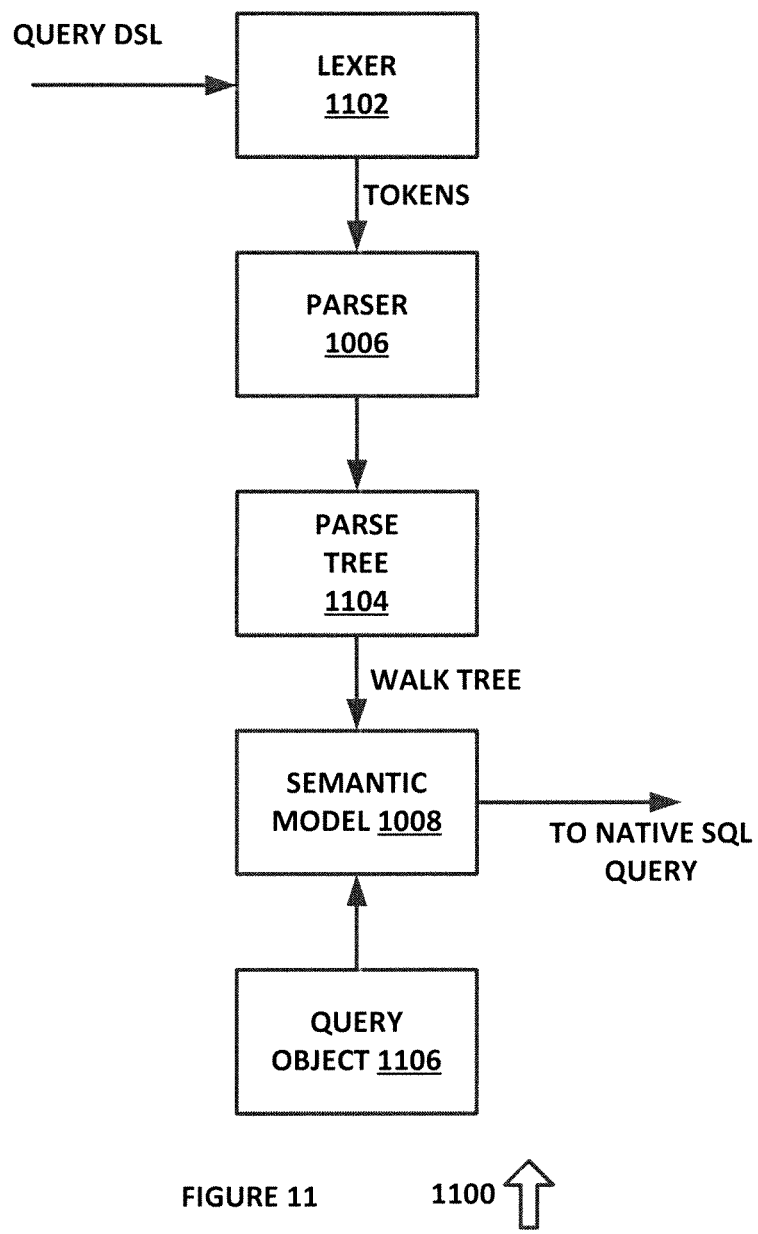
FIG. 11 is a diagram of a process for query syntax processing in accordance with an exemplary embodiment of the present disclosure.

FIG. 11 is a diagram of a process 1100 for query syntax processing in accordance with an exemplary embodiment of the present disclosure. Process 1100 can be implemented in hardware or a suitable combination of hardware and software, and can be one or more software systems operating on a processor.

Process 1100 begins when lexer 1102 receives a query in DSL and performs lexical analysis on the query to generate one or more tokens. Parser 1006 receives the tokens and parses the tokens, such as by using parse tree 1104. Parse tree 1104 can be implemented as an ordered, rooted tree that represents the syntactic structure of a string according to formal grammar. Parse tree 1104 can be constructed in terms of the constituency relation of constituency grammars (=phrase structure grammars), in terms of the dependency relation of dependency grammars, or in other suitable manners. The process then proceeds to semantic model 1008 by stepping through parse tree 1104 by means of the connections between parents and children nodes or in other suitable manners, and utilizing query object 1106.

The disclosed ad hoc domain specific query can be used to generate a number of useful queries within the disclosed architecture. For example, to query all resource objects associated with server, the following queries can be used:

```
FROM server
FROM serverX AS server
From serverX as server
```

It is noted that the above sample queries do not improperly omit the "as" term, such as:

```
FROM serverX server
FROM server
```

In another example, the disclosed ad hoc domain specific query can be used to get ALL serverX resource objects with condition1="true"
FROM serverX AS server WHERE server.condition1='true'

In contrast, the following would be incorrect queries using the disclosed ad hoc domain specific query:

```
FROM serverX WHERE condition1 = 'true' (needs alias)
FROM serverX server WHERE server.condition1 = "true" (single quote only)
```

In an another exemplary embodiment, the disclosed ad hoc domain specific query could be used to get ALL serverX resource objects with users count>5:
FROM serverX AS server WHERE server.usersCount>5

An example of a simple query with collection properties for getting ChassisTemplate containing server configuration for 10.10.10.1

```
From ChassisTemplate AS chassis
JOIN
chassis.serverConfigurations.serverConfigurations
AS serverConfigAlias
WHERE serverConfigAlias.iPv4Address.value = '10.10.10.1'
```

Or, using a native query:

```
(1) SELECT resourse.type, resource.payload'
FROM GENERIC_RESOURCE AS resource
WHERE
(xpath('/*/ServerConfiguration/iPv4Address/value[text( )="10.10.
10.1"]',resource.payload))[1] IS NOT NULL
or
(2) SELECT resource.type, resource.payload
FROM GENERIC_RESOURCE AS resource
WHERE
(CAST((xpath('/*/text( )',(xpath('/*/iPv4Address/value[text( )="1
0.10.10.1"],resource.payload))[1]))[1] AS VARCHAR) =
'10.10.10.1')
```

Examples of relationship queries include a query to get all serverX children from the chassis whose service tag is 8R5332:

```
FROM serverX AS server
    REVERSE JOIN RELATION.Parent-Child as parentRel
    ON (parentRel.RESOURCETYPE = 'chassis')
    WHERE parentRel.serviceTag = '8R5332')
```

For a native Query:

```
SELECT resourse.type, resource.payload
FROM GENERIC_RESOURCE AS resource, RELATION AS rel
WHERE resource.id = rel.toresource_id AND
Resource.type = 'serverX' AND
Rel.relationship_type = 'Parent-Child' AND rel.fromresource_id
IN
(SELECT resource.id
FROM GENERIC_RESOURCE AS resource
WHERE resource.type = 'serverX' AND
(CAST(XPATH/*/serviceTag/text, resource.payLoad)[1] SVARCHAR =
'8R5332'))
```

An example of a query for project children to get all children (server,IOMs) whose parent chassis service tag is 8R5332:

```
SELECT children FROM serverX AS chassis
    JOIN RELATION.Parent-Child AS children
    WHERE chassis.serviceTag = '8R5332'
```

For a native Query:

```
SELECT resourse.type, resource.payload
FROM GENERIC_RESOURCE AS resource, RELATION AS rel
WHERE resource.id = rel.toresource_id AND
Rel.relationship_type = 'Parent-Child' AND rel. fromresource_id
IN
(SELECT resource.id
FROM GENERIC_RESOURCE AS resource
WHERE resource.type = 'serverX' AND
(CAST(XPATH/*/serviceTag/text, resource.payLoad)[1] SVARCHAR =
'8R5332'))
```

An example of a query for project children to get all serverX children whose parent chassis service tag is 8R5332

```
SELECT children FROM serverX AS chassis
    JOIN RELATION.Parent-Child AS children
    ON (children.RESOURCETYPE = 'serverX')
    WHERE chassis.serviceTag = '8R5332'
```

Native Query:

```
SELECT resourse.type, resource.payload
FROM GENERIC_RESOURCE AS resource, RELATION AS rel
WHERE resource.id = rel.toresource_id AND
resource.type = 'serverX' AND
Rel.relationship_type = 'parent-child' AND rel.fromresource_id
IN
(SELECT resource.id
FROM GENERIC_RESOURCE AS resource
WHERE resource.type = 'serverX' AND
(CAST(XPATH/*/serviceTag/text, resource.payLoad)[1] SVARCHAR =
'8R5332'))
```

An example of a query for a project parent to get unique chassis parents for all serverX whole usersCount>5

```
SELECT DISTINCT parent
FROM serverX AS server
REVERSE JOIN RELATION.Parent-Child as parent
ON (parent.RESOURCETYPE = 'serverX')
WHERE server.usersCount > 5
```

Native Query:

```
SELECT resourse.type, resource.payload
FROM GENERIC_RESOURCE AS resource
WHERE resource.id IN
(SELECT relation.fromresource_id
FROM RELATION as relation
WHERE relation.toresource_id IN
(SELECT resource.id
FROM GENERIC_RESOURCE AS resource
WHERE resource.resourcetype = 'serverX' AND
(CAST((xpath('/*/usersCounts/value/text( )',resource.payload))[1]
AS VARCHAR) > 5)))
```

An example of a query to JOIN children, to get chassis parents who has at least one child (servers) with usersCount>5

```
SELECT DISTINCT chassis
FROM serverX AS chassis
JOIN RELATION.Parent-Child AS children
ON (children.RESOURCETYPE = 'serverX')
WHERE children.usersCount > 5
```

Native Query:

```
SELECT resourse.type, resource.payload
FROM GENERIC_RESOURCE AS resource
WHERE resource.id IN
(SELECT relation.fromresource_id
FROM RELATION as relation
WHERE relation.toresource_id IN
(SELECT resource.id
FROM GENERIC_RESOURCE AS resource
WHERE resource.resourcetype = 'serverX' AND
(CAST((xpath('/*/usersCounts/value/text( )',resource.payload))[1]
AS VARCHAR) > 5)))
```

An example of a query to get all serverX whose usersCount>5 and where parent chassis has model 'foo'

```
FROM serverX AS server
REVERSE JOIN RELATION.Parent-Child AS parent
WHERE (parent.model = 'foo' AND server.usersCount > 5)
```

As a native query:

```
SELECT resourse.type, resource.payload
FROM GENERIC_RESOURCE AS resource
WHERE
(CAST((xpath('/*/usersCount/value/text( )',resource.payload))[1]
AS VARCHAR) > 5) AND
resource.id IN
(SELECT DISTINCT relation.toresource_id
FROM RELATION as relation
WHERE relation.fromresource_id IN
(SELECT resource.id
FROM GENERIC_RESOURCE AS resource
WHERE resource.resourcetype = 'serverX' AND
(CAST((xpath('/*/Model/text( )',resource.payload))[1] AS VARCHAR)
= 'foo')))
```

An example of a query to get resource with a unique identifier of 'foo'

```
FROM GENERICRESOURCE AS resource WHERE
resource.UNIQUEID = 'foo'
FROM serverX AS resource WHERE resource.UNIQUEID = 'foo'
FROM GENERICRESOURCE AS resource WHERE
resource.GenericProp.vendor.value = 'serverX'
```

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

What is claimed is:

1. A system for performing an ad hoc query comprising:
a query service operating on a processor and configured to receive an ad hoc query in a domain-specific language;
a query parsing service operating on the processor and configured to receive a validate request and a parse request from the query service and to return a query object to the query service; and
a queryable interface operating on the processor and configured to receive the query object and to transmit the query object to one or more framework services for execution, wherein the ad hoc query contains one or more new key words and the query parsing service and the queryable interface are configured to add the one or more new key words if they are located in an associated model in the framework services.

2. The system of claim 1 further comprising a persistence service configured to receive the query object and to respond to the query object with one or more fields in a query language syntax.

3. The system of claim 1 wherein the query object comprises one or more fields in a query language syntax.

4. The system of claim 1 wherein the query object comprises a SELECT clause comprising a distinct field designator that causes a unique set of objects to be returned.

5. The system of claim 1 wherein the query object comprises a FROM clause that identifies a persistable model class.

6. The system of claim 5 wherein the query object comprises a JOIN clause configured to join to entities related to the persistable model class in the FROM clause.

7. The system of claim 6 wherein the query object comprises an ON clause that is configured to specify one or more JOIN clause conditions.

8. The system of claim 1 wherein the query object comprises a WHERE clause that is configured to specify one or more conditional expressions to filter objects that do not satisfy the conditional expressions.

9. The system of claim 1 wherein the query service is configured to receive the ad hoc query from a north bound interface of an application.

10. The system of claim 1 wherein the query service is configured to expand a set of domain-specific query terms without a change in a query language.

11. The system of claim 1 wherein the query service is configured to expand a set of domain-specific query terms without a change in a query engine.

12. The system of claim 1 wherein the query service is configured to expand a set of domain-specific query terms by deploying a new or changed domain model.

13. A method for performing an ad hoc query comprising:
electronically receiving an ad hoc query in a domain-specific language;
electronically receiving a validate request and a parse request from a query service operating on a processor returning a query object to the query service; and
electronically receiving the query object and transmitting the query object to one or more framework services operating on a processor for execution, wherein the ad hoc query contains one or more new key words and the query service is configured to add the one or more new key words if they are located in an associated model in the framework services.

14. The method of claim 13 further comprising receiving the query object and responding to the query object with one or more fields in a query language syntax.

15. The method of claim 13 wherein electronically receiving the query object comprises electronically receiving one or more fields in a query language syntax.

16. The method of claim 13 wherein electronically receiving the query object comprises electronically receiving a SELECT clause comprising a distinct field designator that causes a unique set of objects to be returned.

17. The method of claim 13 wherein electronically receiving the query object comprises electronically receiving a FROM clause that identifies a persistable model class.

18. The method of claim 17 wherein electronically receiving the query object comprises electronically receiving a JOIN clause configured to join to entities related to the persistable model class in the FROM clause.

19. The method of claim 18 wherein electronically receiving the query object comprises electronically receiving an ON clause that is configured to specify one or more JOIN clause conditions.

20. The method of claim 13 wherein electronically receiving the query object comprises electronically receiving a WHERE clause that is configured to specify one or more conditional expressions to filter objects that do not satisfy the conditional expressions.

* * * * *

UNITED STATES PATENT AND TRADEMARK OFFICE
CERTIFICATE OF CORRECTION

PATENT NO. : 10,114,861 B2
APPLICATION NO. : 14/170494
DATED : October 30, 2018
INVENTOR(S) : Poon et al.

It is certified that error appears in the above-identified patent and that said Letters Patent is hereby corrected as shown below:

In the Drawings

1. In Fig. 3, Sheet 3 of 9, in Tag "312", Line 2, delete "MANAGAMENT" and insert -- MANAGEMENT --, therefor.

In the Specification

2. In Column 2, Line 8, delete "of system" and insert -- of a system --, therefor.

3. In Column 2, Line 11, delete "of system" and insert -- of a system --, therefor.

4. In Column 7, Line 13, delete "of system" and insert -- of a system --, therefor.

5. In Column 7, Line 62, delete "of system" and insert -- of a system --, therefor.

6. In Column 8, Line 1, delete "application management interface 312" and insert -- appliance management interface 312 --, therefor.

7. In Column 11, Lines 30-31, delete "compensation service 530," and insert -- compensation service 534, --, therefor.

8. In Column 11, Lines 34-35, delete "device driver instance 548," and insert -- resource instance 548, --, therefor.

9. In Column 11, Line 42, delete "Compensation service 530" and insert -- Compensation service 534 --, therefor.

10. In Column 11, Line 58, delete "device" and insert -- device. --, therefor.

11. In Column 13, Line 12, delete "profile 81" and insert -- profile 818 --, therefor.

Signed and Sealed this
Twenty-first Day of May, 2019

Andrei Iancu
*Director of the United States Patent and Trademark Office*

12. In Column 14, Line 33, delete "meta data" and insert -- metadata --, therefor.

13. In Column 14, Line 36, delete "meta data" and insert -- metadata --, therefor.

14. In Column 20, Line 1, delete "fixed)." and insert -- fixed. --, therefor.

15. In Column 20, Line 66, delete "querable" and insert -- queryable --, therefor.

16. In Column 22, Line 53, delete "In an another" and insert -- In another --, therefor.